US007643051B2

(12) United States Patent
Sandberg et al.

(10) Patent No.: US 7,643,051 B2
(45) Date of Patent: Jan. 5, 2010

(54) MOBILE VIDEO TELECONFERENCING SYSTEM AND CONTROL METHOD

(76) Inventors: Roy Benjamin Sandberg, 218 Knoxville Ave., Apt. #B, Huntington Beach, CA (US) 92648; Dan Ron Sandberg, P.O. Box 19407, San Francisco, CA (US) 94309

( * ) Notice: Subject to any disclaimer, the term of this patent is extended or adjusted under 35 U.S.C. 154(b) by 820 days.

(21) Appl. No.: 11/223,675

(22) Filed: Sep. 9, 2005

(65) Prior Publication Data

US 2007/0064092 A1   Mar. 22, 2007

(51) Int. Cl.
H04N 7/14 (2006.01)
G06F 19/00 (2006.01)

(52) U.S. Cl. ............... 348/14.02; 348/14.08; 348/14.12

(58) Field of Classification Search ... 348/14.01–14.16; 180/9.32, 9.34, 9.36, 9.38, 8.1; 446/75, 484, 446/454; 700/245, 259; 901/1, 46, 47
See application file for complete search history.

(56) References Cited

U.S. PATENT DOCUMENTS

| | | | |
|---|---|---|---|
| D361,587 S * | 8/1995 | Chapman | D16/242 |
| 6,292,713 B1 | 9/2001 | Jouppi | |
| 6,535,793 B2 | 3/2003 | Allard | |
| 6,597,143 B2 | 7/2003 | Song et al. | |
| 6,764,373 B1 * | 7/2004 | Osawa et al. | 446/175 |
| 6,845,297 B2 | 1/2005 | Allard | |
| 6,883,201 B2 | 4/2005 | Jones | |
| 6,888,333 B2 | 5/2005 | Laby | |
| 6,914,622 B1 | 7/2005 | Smith | |
| 6,920,376 B2 | 7/2005 | Jouppi | |
| 6,925,357 B2 | 8/2005 | Wang | |
| 2001/0037163 A1 | 11/2001 | Allard | |
| 2002/0027597 A1 | 3/2002 | Sachau | |
| 2002/0141595 A1 * | 10/2002 | Jouppi | 381/2 |
| 2002/0189871 A1 * | 12/2002 | Won | 180/9.32 |
| 2004/0019406 A1 | 1/2004 | Wang | |
| 2004/0088078 A1 | 5/2004 | Jouppi | |
| 2004/0117065 A1 | 6/2004 | Wang | |
| 2004/0167666 A1 | 8/2004 | Wang | |
| 2004/0170300 A1 | 9/2004 | Jouppi | |
| 2004/0179714 A1 | 9/2004 | Jouppi | |
| 2004/0182614 A1 * | 9/2004 | Wakui | 180/7.1 |
| 2005/0052527 A1 | 3/2005 | Remy | |
| 2005/0110867 A1 | 5/2005 | Schulz et al. | |
| 2005/0122390 A1 | 6/2005 | Wang | |
| 2005/0125098 A1 | 6/2005 | Wang | |
| 2005/0204438 A1 | 9/2005 | Wang | |
| 2005/0240310 A1 | 10/2005 | Wang | |

(Continued)

FOREIGN PATENT DOCUMENTS

CA    2289697 C    11/1998

OTHER PUBLICATIONS

Eric Paulos, et.al., PRoP: Personal Roving Presence, 1998, ACM SIGCHI Conference, http://www.prop.org/papers/index.htm.

(Continued)

*Primary Examiner*—Melur Ramakrishnaiah

(57) ABSTRACT

A mobile video teleconferencing system comprising an audio-visual assembly atop a vertical support structure mounted to a powered, wheeled base. The device is controlled through a wireless Internet connection by a remote user, and is light enough to be carried with one hand.

9 Claims, 8 Drawing Sheets

U.S. PATENT DOCUMENTS

2005/0267826 A1    12/2005  Levy
2006/0011391 A1*   1/2006   Isozumi et al. ............... 180/8.1
2006/0082642 A1*   4/2006   Wang et al. ............... 348/14.05
2006/0257137 A1*   11/2006  Fromm ...................... 396/420

OTHER PUBLICATIONS

Eric Paulos, et.al., Designing Personal Tele-embodiment, 1998, IEEE International Conference on Robotics and Automation, http://www.prop.org/papers/index.htm.

http://edition.cnn.com/2005/TECH/05/18/Spark.robodoc/.

http://www.gizmag.com/go/3459/.

http://www.intouch-health.com/articles.html.

Eric Paulos, et.al., Delivering Real Reality to the World Wide Web via Telerobotics, 1996, IEEE International Conference on Robotics and Automation, http://www.prop.org/papers/index.htm.

Eric Paulos, et.al., Ubiquitous Tele-embodiment: Applications and Implications, 1997, Special Issue on Innovative Applications of the World Wide Web, International Journal of Human-Computer Studies, http://www.prop.org/papers/index.htm.

Eric Paulos, et.al., Social Tele-embodiment: Understanding Presence, Jul. 2001, Autonomous Robots Journal, http://www.prop.org/papers/index.htm.

* cited by examiner

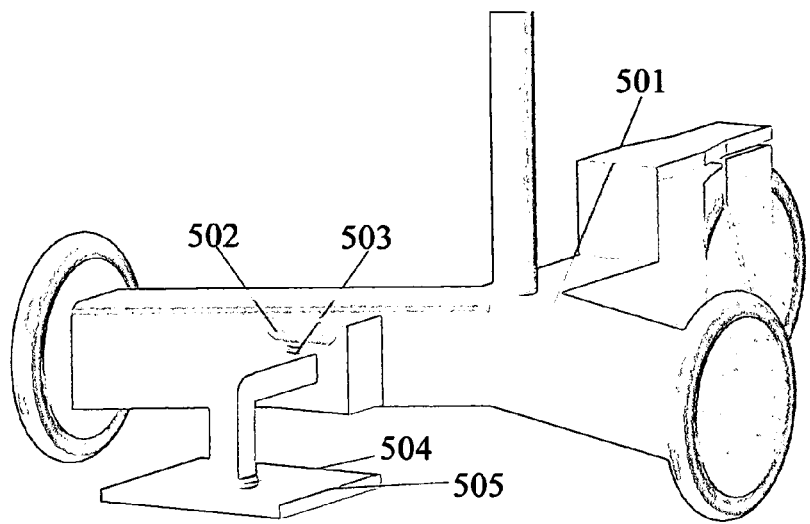
FIG.5
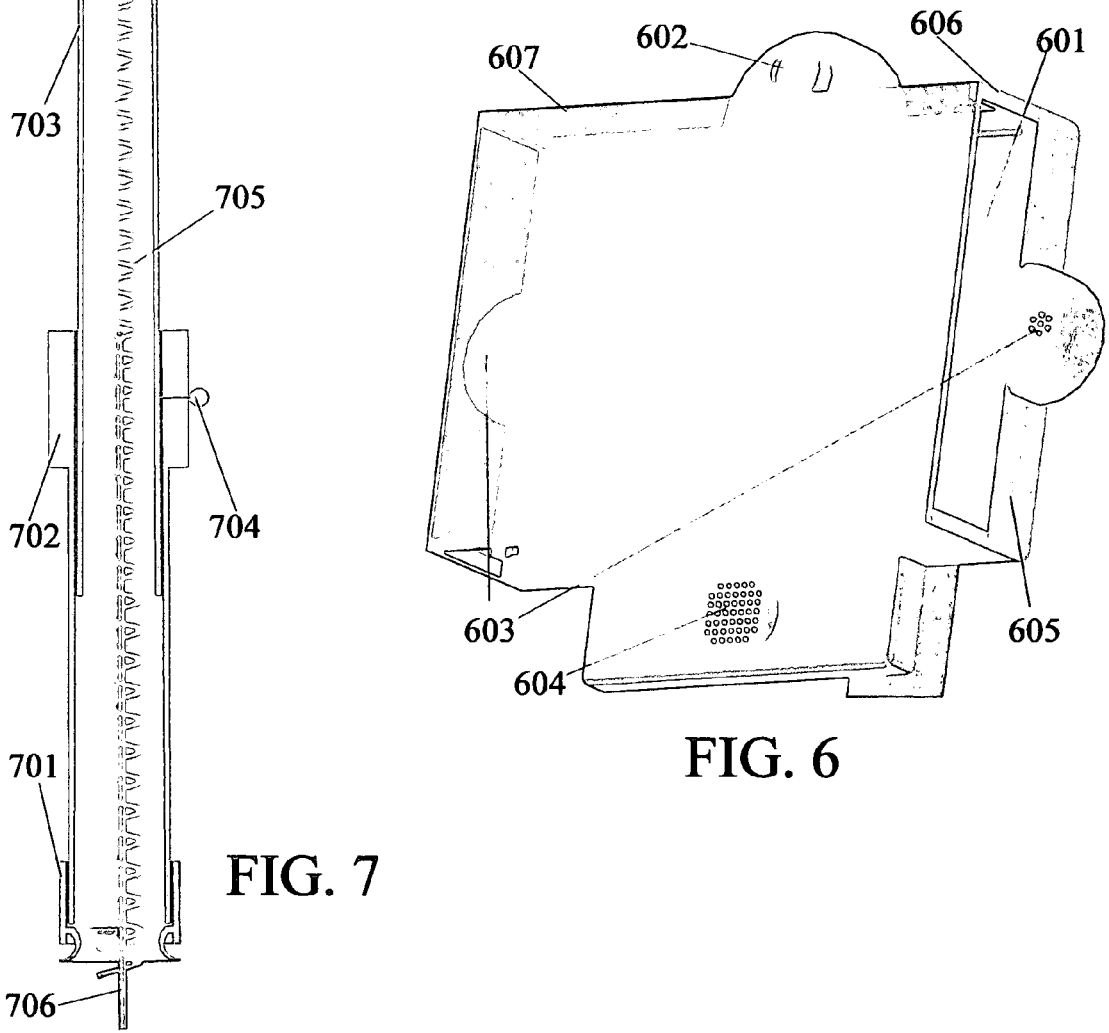
FIG. 6
FIG. 7

MOBILE VIDEO TELECONFERENCING SYSTEM AND CONTROL METHOD

BACKGROUND OF THE INVENTION (1) Field of Invention

The present invention is related to the field of video teleconferencing, more specifically, the invention is a mobile remotely controlled video teleconferencing system.

(2) Related Art

Portable video teleconferencing systems, such as that described in Janda (U.S. Pat. No. USD208,634), have existed since the 1960s. The high costs of bandwidth and specialized equipment prevented widespread adoption for decades. The availability of inexpensive computers and broadband Internet access in the 1990s led to an explosion in the use of video teleconferencing. While video teleconferencing provides a more life-like user experience than phone teleconferencing, the inability of a user to move around in a remote location is still a serious limitation.

Mobile video teleconferencing robots allow a user to see, hear, and move around in a remote location. The ability to move around provides the user a much richer experience than conventional video teleconferencing because it is a closer approximation to actually being in the remote location. Despite this significant advantage, mobile video teleconferencing has not become a widely used technology. Rudimentary solutions such as placing a conventional video teleconferencing system on a manually movable cart do offer some improvement, but they necessitate a high degree of cooperation from the remote party that the user wishes to conference with. Niche market solutions such as Wang, et. al. (US Patent No. US20040117065A1) are inadequate for general use because they are costly, heavy, difficult to setup, difficult to transport, dangerous and not versatile.

More specifically, the device discussed in Wang allows doctors to remotely visit their patients in a hospital. However, the Wang device costs approximately $88,000 and is thus unsuitable for consumer or low-cost commercial use. (see http://edition.cnn.com/2005/TECH/05/18/Spark.robodoc/) The Wang device's extreme weight of approximately 200 pounds leads to many serious shortcomings. (see http://www.gizmag.com/go/3459/) Taking the device up and down stairs is difficult even with multiple people. Transporting the device by car is similarly impractical. The weight also leads to increased device cost due to the higher cost of shipping and requirement for additional raw materials. The weight also leads to a danger of collisions with people and animals which must be mitigated with costly sensors and electronics. A heavy device also necessitates a need for larger motors and larger batteries, which further add to the total device weight and cost.

The Wang device has several other design shortcomings that prevent it from being useful outside its intended niche. The height of its LCD and camera is not adjustable. This prevents the remote user from exercising a psychological advantage by being taller or shorter than the person he is communicating with. Additionally, this makes conversations with seated people awkward. The Wang device does not support stereo microphones. Consequently the remote user cannot determine the direction that sounds are coming from without a visual queue. This makes it difficult for the remote user to know who is talking when conversing with multiple people as might occur in a conference room.

The Wang device's low ground clearance and lack of gyroscopic video stabilization make it unsuitable for use on uneven ground. As far as is known, the Wang device does not have a docking station that allows the remote user to charge the device without local intervention. Thus a local user must be intervene periodically to keep the device operative. The Wang device also lacks a movable actuator which could be used for pressing elevator buttons. All of these limitations render the Wang device unsuitable for many applications.

Eric Paulos and John Canny's 1998 paper "PRoP: Personal Roving Presence" discuss a mobile video teleconferencing robot. Their 'PRoP' robot suffers from many of the same limitations as the Wang device robot. Among these deficiencies are the lack of stereo microphones, lack of gyroscopic image stabilization, lack of adjustable height, low ground clearance, and lack of remote charging capability.

Additionally, the PRoP robot suffers from some design deficiencies not found in the Wang device. Its LCD and camera are far from each other, which leads to eye-gaze preservation problems. Specifically, a local user looking straight into the eyes of the image displayed on PRoP's LCD will appear to the remote user to be looking away from him because of the distance between the LCD and the camera. While PRoP's camera can tilt to face the local user, its LCD does not which further compounds the eye-gaze preservation problem. Additionally, its LCD is very small which may make the local user feel like the remote user is far away even when PRoP is physically close to the local user.

The PRoP does not appear to be designed for easy hand carrying. Its base appears heavy and unwieldy. The stalk has no handle or suggested grip-point. Similarly, the stalk-base attachment point doesn't appear to be strong enough for the additional forces caused by hand-carrying. Additionally, the stalk gives no indication of being collapsable for easy shipment, relocation and storage of the device.

PRoP's height and base configuration results in an unstable design that leaves it susceptible to falling while traversing rough terrain, ramps, or in the event of a collision with a person or object. Furthermore, in the event the device does fall, no protective mechanisms are in place to protect PRoP's delicate electronics from damage. The lack of fall-over survivability limits the device's use in real-world applications.

An Internet appliance is a stand-alone special purpose consumer product which accesses the Internet and is easy to configure and use. Both PRoP and the Wang device both appear to require complicated installation and additional hardware to operate. Consequently, they are not Internet appliances, and are inappropriate for the consumer market.

SUMMARY OF THE INVENTION

The present invention is a new and improved mobile video teleconferencing system, which overcomes the many disadvantages inherent in the related video teleconferencing systems. Unlike existing systems, this mobile video teleconferencing system includes a hand carry-able Internet appliance known as a mobile video teleconferencing device ("MVTD"). The goal of hand carry-ability leads to a design focused on shape and weight. This focus informs many aspects of the invention.

The present invention comprises a video camera, video screen, microphone, and a speaker, all mounted as an electromechanically tiltable assembly ("an A/V assembly") atop a lightweight stalk, trellis, or other support structure. In turn, the support structure is mounted to a base equipped with powered wheels. Through the use of motion control techniques known in the art, and wireless communications techniques known in the art, a remote user can control the device, for example, over an Internet link. The invention can thus be made to negotiate its local environment under the control of a remote user. In particular, the device should be able to negotiate ramps, doorways, and other obstacles that comply with the Americans with Disabilities Act. This allows the device to access most commercial spaces in the United States.

In one embodiment, the stalk length is designed such that the A/V assembly is at substantially the same height as a standing human, thereby facilitating eye-to-eye communication between a local user, who is a person in the MVTD's local environment, and the remote user. Alternatively, a stalk length may be selected such that the A/V assembly is higher than the height of an average human, thereby providing a greater field of view and facilitating uses that involve surveillance. In another alternative, the stalk length may be adjusted by the local user so that the A/V assembly can assume a range of heights spanning that of a sitting human and that of a standing human. Finally, the stalk length may also be adjusted electromechanically through a data network such as that Internet by the remote user.

The telescoping capability used to control the height of the device may also be used to collapse the stalk assembly for easy shipment, relocation or storage of the device. Alternatively, a hinge could be used to allow the stalk to fold in half. Sections of the base may also be hinged or detachable to minimize the size of the MVTD when not in use. Removing or folding of the wheels can further reduce the overall volume of the device, thereby facilitating shipment, relocation or storage of the device.

As the height of a MVTD increases so does the likelihood of it falling over. Therefore the design of a tall MVTD must address stability issues. Unlike the related art, the invention addresses this issue without making the base heavy. Rather, the design concentrates on making the top of the device as lightweight as possible leading to a low center of gravity. This allows the device to be made sufficiently stable to negotiate ramps as well as light enough to be easily carried by an average human with one hand. The design's low weight allows the invention to be carried up stairs or hand-carried to new locations that cannot be reached under the invention's own power.

In some cases obstacles and unexpected interaction with its environment may still cause a MVTD to fall over. Due to the invention's low weight it is possible to integrate a low cost impact protection system thereby decreasing the possibility of damage in the event of a fall. Harm to objects and people near the device is similarly minimized by the device's light weight as well as the compliant nature of the impact protection element. In the event the device falls over, the remote user may call out to users in the device's environment for assistance in righting the device. For example, the remote user may exclaim, "I've fallen but I can't get up." Due to the device's low weight, righting the device is easily accomplished.

The preferred base consists of two parallel wheels which can keep the device upright in the same manner as described in Kamen (U.S. Pat. No. 6,779,621). This configuration minimizes weight by requiring fewer wheels and motors than the more common three or four wheeled robotic base. Alternative base configurations include the use of treads driven by two or more motors, which would enhance stair climbing ability. Other embodiments would use varying numbers and configurations of wheels, as is described in the literature related to robotic bases.

Regardless of which wheel/tread and motor configuration moves the base, keeping the base internals light is critical. The base internals may include a microprocessor, a battery, motors, a motor controller, a wireless interface, and a docking port. The base serves as a strong attachment point for the stalk. This attachment point must be strong to allow the device to be carried by the stalk, and stiff enough to keep movement induced oscillation of the camera atop the stalk at a reasonable level.

The preferred embodiment of the stalk is a hollow tube made of an internally damped material such as plastic. This will minimize camera movement when the robot is moving. A hollow tube also reduces weight and hides the wires that run between the base and the video subassembly. The stalk may have a grip area to ease carrying of the device with one hand. Alternatively, a handle can protrude from the stalk for carrying. Alternate embodiments of the stalk include multiple supports that come together at the video subassembly and a rectangular support region. External damping may be used instead of or in addition to internal damping. For example, a shock absorber may be used to damp excess vibration.

The video sub-assembly includes a video display, at least one video camera, at least one microphone, and an antenna. The antenna may also be located in the stalk or in the base. The video display may be a touch-screen to allow the local user to have greater control of the mobile video teleconference process. The video sub-assembly may also be motorized to allow tilting, panning, or both tilting and panning. This tilting, panning, or tilting and panning would be under the control of the remote user. Two cameras may be used to offer stereoscopic vision, or to allow gaze-preservation through software means known in the art. The camera or cameras should be placed as close as possible to the screen to improve gaze preservation. A screen large enough to display the remote user's head in its actual size may optionally be used to improve a local user's sensation of interacted with the remote user as if the remote user were physically present. Two microphones may be used to allow a remote user to determine the direction that sounds are coming from. This would allow the remote user to know who is talking when conversing with multiple people as might occur in a conference room.

The robot may be connected to the Internet or to another network. A wired or wireless link may provide this connection. In the preferred embodiment, a wireless link such as the IEEE 802.11 or the IEEE 802.16 protocol family or a cellular telephony protocol (for example, CDMA2000 1xEV-DO or W-CDMA) will allow communication between the robot and the network. Alternative embodiments include wired protocols such as Ethernet, and wireless technologies such as laser, infrared, ultrasound, and ultra-wide band radio.

Because the robot is designed to have minimum weight the area of the base will be small and the mass of the stalk and base will also be minimal. This may lead to camera instability when the robot is moving or has external forces applied to it. Excessive camera jitter can be a serious problem when someone is guiding the robot. Thus camera-stabilization is extremely important. This can be done using accelerometers, gyroscopes, and computer vision techniques, all of which are known in the relevant art. These tilt sensors may also be used to dynamically stabilize the two-wheeled base.

In the preferred embodiment the center of gravity of the robot is located in the lower third of the apparatus's height. This will lead to greater stability when the robot is moving. Even with this consideration, perfect stability can not be assured. This is especially true in the preferred embodiment where dynamic stabilization is used to keep the robot upright. The impact protection system is designed to protect the robot from damage in the case of a fall. Outriggers extending from the base, stalk, or A/V assembly provide a light weight mechanism to cushion the video-subassembly from a fall. The outriggers may be made of foam, rubber, plastic, or any other light and shock absorbing material. An impact protection system may also be mounted directly onto the A/V assembly. In the preferred embodiment, a transparent plastic barrier mounted on a shock absorbing spacer attaches in front of the video display and protects it from direct impact with an object such as a table.

A remote user may charge the MVTD by driving it to a docking station and interfacing to a charging coupler. Electrical coupling between the docking station and the MVTD can be accomplished inductively, or through a direct electrical connection. A sensor on the MVTD may detect when it is docked correctly so that the remote user can be sure it is charging properly.

Allowing the stalk to rotate in the fore-aft direction around its base attachment point allows the center of gravity of the robot to shift towards the front or back of the MVTD. This is useful for going up steep inclines or declines. This tilting can be under control of the on board computer, manually controlled by the remote operator, or both.

A shaft which extends from the stalk and whose height is electromechanically adjustable can be used to press elevator buttons. In this way a remote user may operate elevators. In addition to or instead of the elevator actuating shaft, manipulators such as a robotic arm may be used. These appendages would further increase the range of actions available to the remote user.

The method by which the mobile video teleconferencing system is used will now be described. A bidirectional data link is established between the MVTD and a remote computational device, for example a personal computer. Audio and video from the remote computational device is sent to the MVTD and displayed and played on its video display and speakers. Audio and video from the MVTD will be sent to the remote computational device and played on its speakers and displayed on its video display. Protocols known in the art, such as ITU-T H.323 may be used to transmit the audio and video. These may be used as implemented in stand-alone video teleconferencing packages, such as Microsoft Windows Messenger, GnomeMeeting, or Vic. Alternatively, a software library implementing a protocol may be used, such as OpenH.323. Movement commands are also sent over the bidirectional data link from the remote computational device to the MVTD, thereby commanding the MVTD to move to a new physical location. Other commands may be used to change the orientation of the A/V assembly, move the elevator actuator shaft, and control any other actuators on the MVTD. Status information may also be sent from the MVTD to the remote computational device thereby informing the remote user of changes within the MVTD or its environment.

DETAILED DESCRIPTION OF THE DRAWINGS

FIG. 5 is a close up of the docking station and mobile video teleconferencing device docking mechanism.

FIG. 6 is a close-up of the A/V assembly.

FIG. 7 is a cross-sectional view of the collapsible vertical support mechanism, here a telescoping tube.

DETAILED DESCRIPTION OF THE INVENTION

The present invention is a new and improved mobile remotely controlled video teleconferencing system overcoming the many disadvantages of existing video teleconferencing systems.

Figure 1:
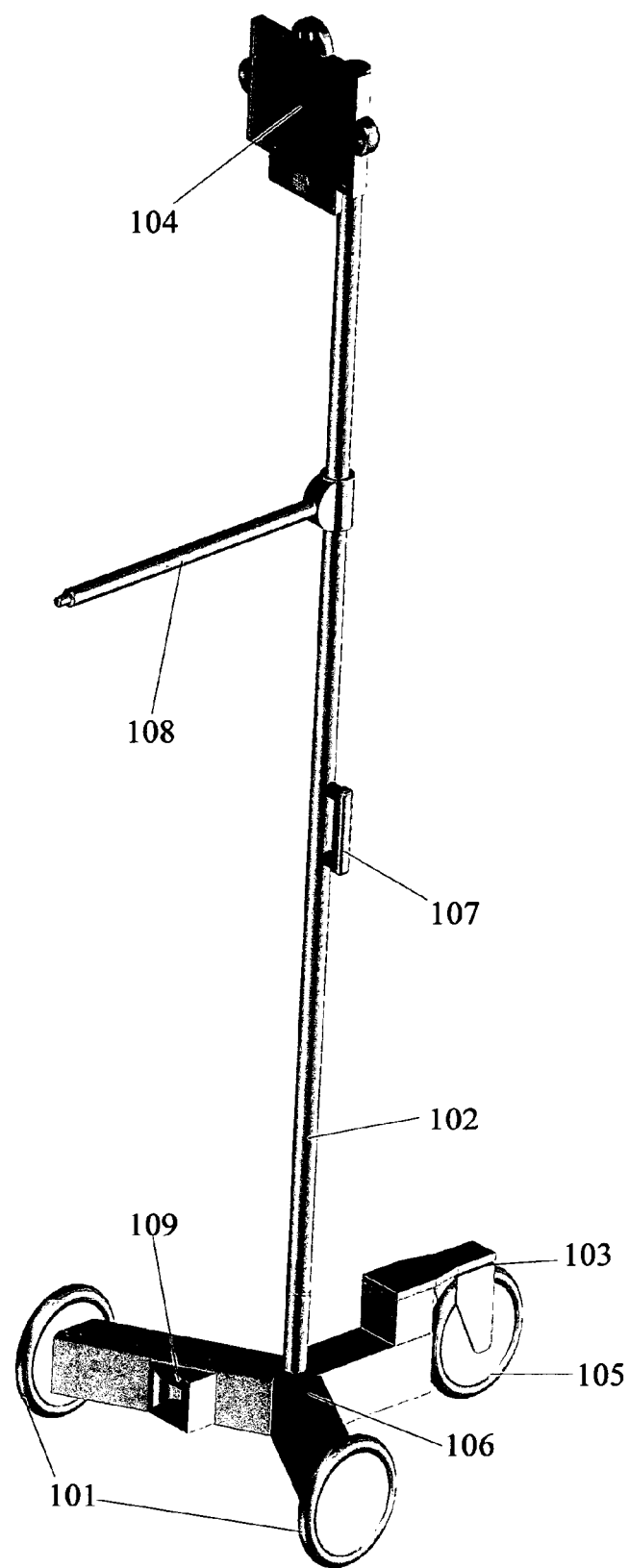
FIG. 1 is an isometric view of the mobile video teleconferencing device.

FIG. 1 is an isometric view of the mobile video teleconferencing device ("MVTD"). The base 106 consists of a Y-shaped body containing the electronics and drive mechanisms (not shown). Other base shapes, such T-shaped bodies, rectangular bodies or circular bodies may also be used. Two drive wheels 101 are situated in a parallel configuration on each of two sides of the base, with an unpowered wheel 105 connected to the third side of the base. The unpowered wheel 105 is connected to a swivel mechanism 103, whereby it is permitted to rotate freely. In some embodiments, the body may be fabricated in hinged or detachable segments, thereby facilitating storage or shipment of the device. A specific example of this would be designing the leg of a T- or Y-shaped body containing the unpowered wheel to hinge upwards or detach. This could reduce the depth of the device by more than 50% during shipment or storage.

The device may be steered by controlling the ratio of speeds between the two drive wheels. In an alternative embodiment, one powered wheel with a steering mechanism and two unpowered wheels on fixed axles may be used.

Figure 2:
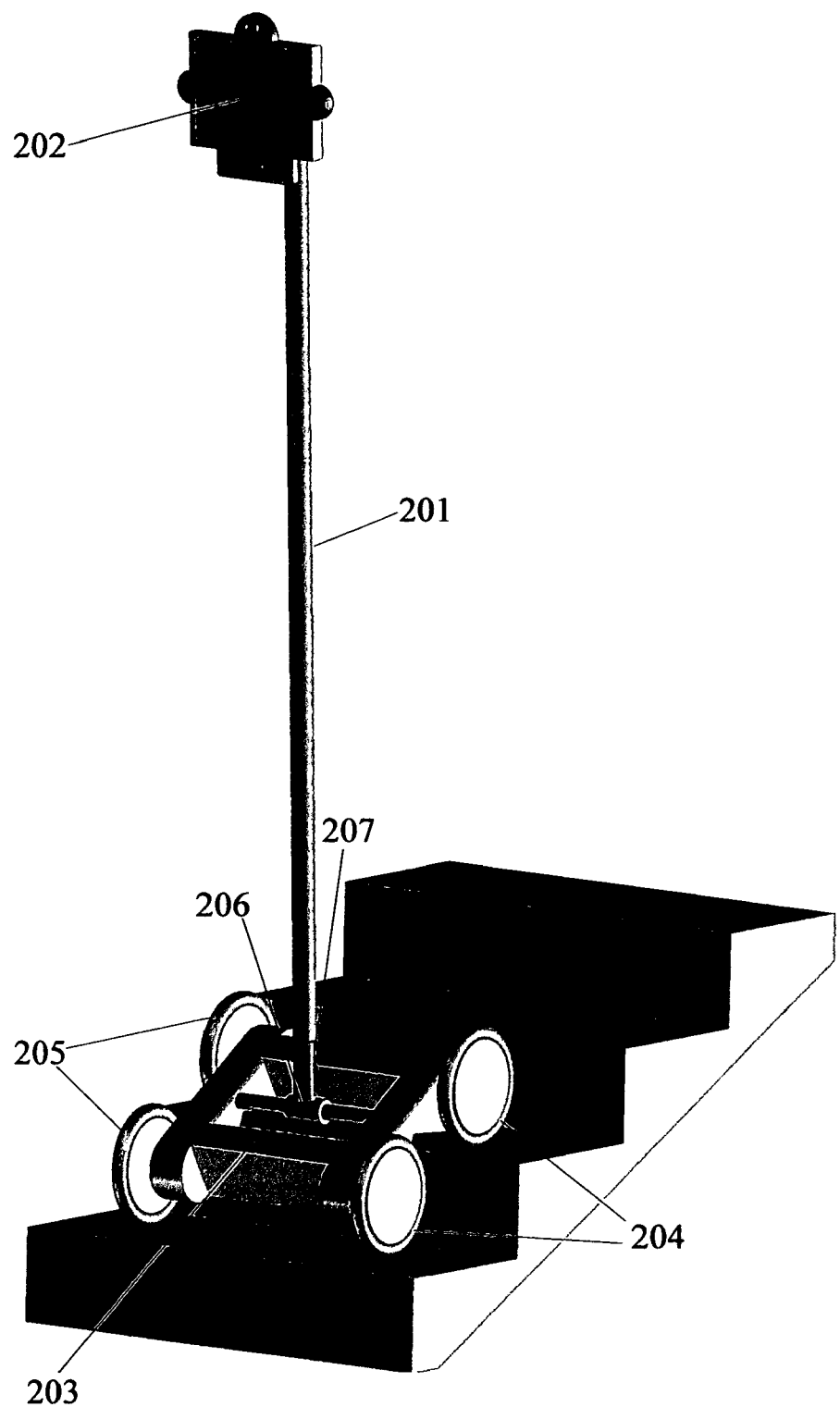
FIG. 2 is a view of the mobile video teleconferencing device in a 4×4 configuration, designed to enable stair climbing.

A vertical support member 102, here a metal pole, extends in a direction normal to the top of the base. In alternative embodiments, the vertical support member may be a trellis, a parallel arrangement of two or more poles, a rectangular column, or a triangle or pyramid of vertical elements, originating at a common point at their upper extreme, and splaying outwards as they approach the base. The vertical support member may be made of any material with adequate tensile strength to support a small load. In the preferred embodiment, a material with a high strength-to-weight ratio, low cost, and high damping should be chosen. The A/V assembly 104 is mounted atop the vertical support member. The A/V assembly is discussed in greater detail below. A carrying handle 107 is provided to enable a local user to easily carry the device with one hand. An elevator button selection mechanism 108, allows a remote user to press elevator buttons remotely, thereby enabling the device to use conventional elevators without any special modifications to the elevator. The elevator button selection mechanism comprises a short pole ending in an elevator button contacting member, the height of which can be adjusted by an electromechanical system controlled by a remote user. MVTD docking port 109 mates with a docking station thereby enabling the remote user to charge the MVTD FIG. 2 is a view of the MVTD in a 4×4 configuration, designed to enable stair climbing. The vertical support member 201, and A/V assembly 202, are substantially the same as depicted in FIG. 1, but the body 203 is a rectangular configuration in this embodiment, with attachment points for four wheels. A first set of wheels 204, on the right side, are driven by a first motor. A second set of wheels 205, on the left side, are driven by a second motor. The device thus has four driven wheels, and turns by altering the relative speeds of the left side and right side wheels. The vertical support member is mounted to a motorized joint 206. Via control of the motorized joint, the vertical support member may be kept substantially vertical even when the base is climbing or descending ramps or stairs. A torque sensor 207, mounted in series with the vertical support member, is used to detect the current orientation of the vertical support member. A measured torque at or near zero implies that the vertical support member is properly balanced, whereas a positive or negative torque will elicit a compensatory movement at the motorized joint. Thus, in concert with a feedback loop to the motorized joint, the torque sensor is used to maintain the vertical orientation of the vertical support member. In an alternative embodiment, weight sensors over the wheels may also be used to close the feedback loop with the motorized joint. In this embodiment the difference in weight value between fore and aft weight sensors is used in a manner similarly to the torque value in the previous embodiment. When the fore and aft weight sensor values are substantially the same, the vertical support member is considered to be balanced. Positive or negative differences between the fore and aft weight sensor values will elicit a compensatory movement at the motorized joint.

In another alternative embodiment, the vertical support member's orientation is shifted in order to move the center of gravity closer to either the front or rear axle. This decreases the amount of weight on the axle climbing the rise of the stair while increasing the weight of the axle that is on the run of the stair, thereby reducing slipping while climbing stairs. To prevent the device from falling, the center of gravity must be kept within the region demarcated by the shape formed by the contact points of the wheels. To be more exact, the center of gravity averaged over time, when projected onto a horizontal plane, must be located within the convex hull formed by the ground contact patches of the wheels as projected onto the horizontal plane.

Figure 3:
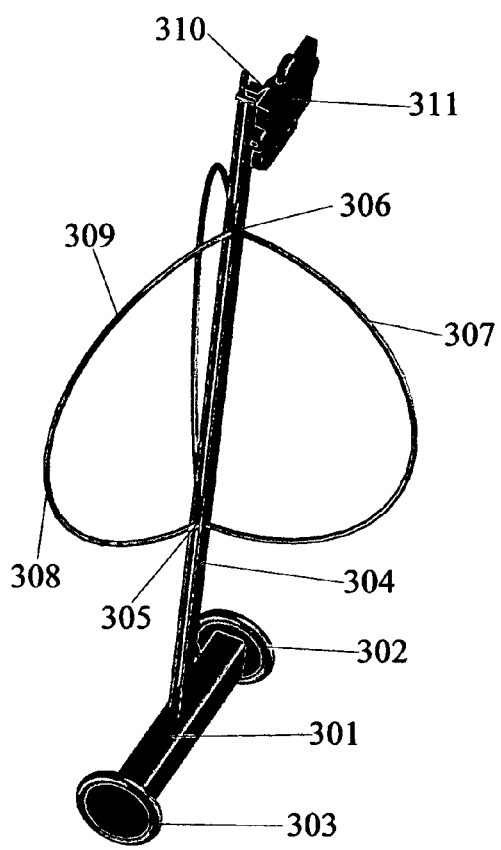
FIG. 3 is a view of the mobile video teleconferencing device with impact protection in a two-wheeled, dynamically-stabilized configuration.

FIG. 3 is a view of the MVTD in a two-wheeled, dynamically-stabilized configuration. The device is dynamically stabilized through the use of a gyroscope, accelerometer, or other means of dynamic stabilization known in the art. In this embodiment, the base 301 is an elongated rectangle with a left powered wheel 302, and a right powered wheel 303, attached to the ends of the rectangle along the major axis. In alternative embodiments, any base shape with attachment points for two parallel wheels may be used. Vertical support member 304, a triangular trellis, extends from the center of the base and supports the A/V assembly 311. The A/V assembly's vertical tilt mechanism 310 connects the A/V assembly 311 to the top of the vertical support member. A front-side fall-over bar 307, protects the A/V assembly from damage in the event the device is knocked-over or falls. The front-side fall-over bar connects to the trellis structure at a lower attachment point 305, and an upper attachment point 306. A right-rear-side fall-over bar 308, and a left-rear-side fall-over bar 309, also connect at the lower attachment point 305 and the upper attachment point 306. Alternative configurations for the fall-over bars, and an alternative number of fall-over bars may also be used. The fall-over bars are composed of hollow, flexible rubber tubing, that is designed to flex on impact, thereby absorbing the shock of the impact, and preventing or reducing the impact between the A/V assembly and an object such as the ground. The fall-over bars may alternatively be composed of any lightweight flexible material suitable for absorbing energy from an impact without breaking. For example, a spring or flexible plastic or metal rod or band may also be used. In another embodiment, impact protection is provided by one or more shock absorbent blocks (for example, foam blocks) mounted on the vertical support member.

Figure 4:
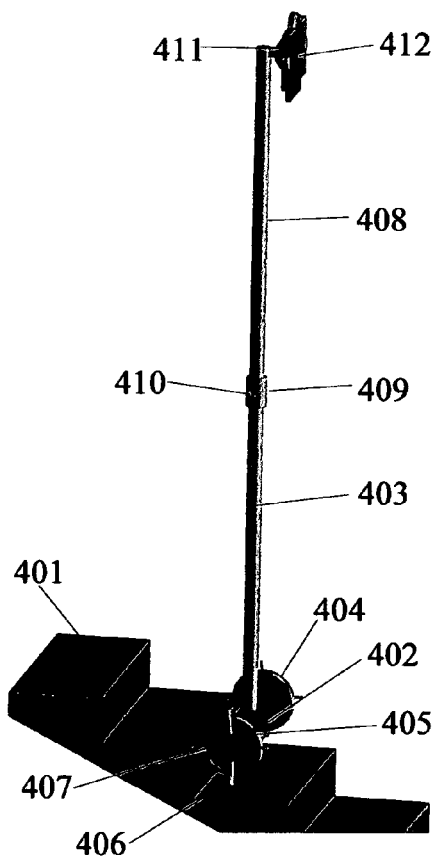
FIG. 4 is a view of the mobile video teleconferencing device in a two-wheeled, dynamically-stabilized configuration with stair-climbing capability.

FIG. 4 is a view of the MVTD in a two-wheeled dynamically-stabilized configuration with stair-climbing capability. The device is shown climbing stairs 401. The rectangular base 402 provides an attachment point for the wheels and the vertical support member. In alternate embodiments, the base may take other shapes, such as cylinders, I-beams, triangles, or any other shape capable of providing attachment points for two wheels and a vertical support member. The drive circuitry, gears, batteries, and motors may be inside or outside of the base in alternative embodiments. The lower vertical support member 403 extends vertically upwards from the center of the base. A left-side driven wheel 404, and a right-side driven wheel 405, extend from the ends of the base in a parallel configuration. Both wheels have retractable traction bars 406, mounted at intervals around the circumference of the wheel. In the preferred embodiment, the retractable traction bars are mounted at 90 degree increments, but any other angular arrangement may be used. In the preferred embodiment, the retractable traction bars are implemented as rubber-capped cylinders that are spring-loaded to collapse into a barrel 407 when the weight of the device forces them down during regular motion. However, when the traction bars contact an outside surface (such as a stair ledge) at a substantially horizontal angle, as shown at 407, they will not retract, and provide firm contact with the outside surface so that the wheel can climb up and onto the outside surface. This is intended to allow the wheel to climb stairs that have a rise height less than or equal to the wheel's radius. The A/V assembly's motorized tilt-mechanism 411 connects the A/V assembly 412 to the upper vertical support member 408. The vertical support member height may be adjusted by a local user through the use of a locking collar 409, and a set screw 410. By loosening the set screw, the local user may collapse a portion of the upper vertical support member into the lower vertical support member. Other means of securing the vertical support at variable or fixed heights may also be used. Examples include locking clasps, cams, threaded shafts, pins, or variably restrictive retainers. In other embodiments, an electromechanical system may be used to adjust the height of the upper vertical support member either through a local interface or through a command sent remotely over the wireless link. This allows a remote user to control the height of the A/V assembly, and also allows a local user to collapse the vertical support member for easy shipment, relocation or storage.

FIG. 5 is a close up of the docking station and MVTD docking mechanism. The MVTD base 501 is shown with the docking port 502. The docking station mating prong 503 is designed to interface with the docking port. By driving the MVTD into the docking station mating prong, a remote user may charge the MVTD. For dynamically stabilized embodiments, the mating prong also acts to prevent the MVTD from falling over when it is turned off. Other means of preventing dynamically stabilized embodiments from falling over may also be incorporated into the docking station design. For example, spring loaded clasps may grab the MVTD along the stalk, or a flat platform may contact the underside MVTD base, providing a stable horizontal platform for the MVTD to rest on. A docking station swivel 504, simplifies the task of aligning the docking station mating prong with the docking port. Additional degrees of freedom may optionally be provided on the docking station or the docking port to further simplify docking. The docking station base 505, provides a stable platform for the docking station, and is designed to hold the docking station stationary while the docking port is being forced against the docking station mating prong by the remote user. Electrical connectivity between the docking station and a household electrical outlet is not shown. The preferred embodiment consists of a corded plug. In the preferred embodiment, household voltage is transformed to a safe low voltage such as 12V AC. An inductive coupling between the docking station and the docking port permits the charging of the MVTD without exposed metal contacts. Alternatively, a safe AC or DC voltage may charge the MVTD through an electrical coupling. In lieu of the docking station, an electro-mechanically moveable electrical plug may be positioned by the remote user at the proper height such that the remote user can, by driving the MVTD, connect the plug into a standard electrical outlet. This provides a means for charging the MVTD that does not require any special external connectors.

FIG. 6 is a close-up of the A/V assembly. The display screen 601 (a color LCD screen in the preferred embodiment) is mounted in the A/V assembly body 605. In the preferred embodiment, the display screen is large enough to display the remote user's head in its actual size. A color camera 602 can be seen at the top of the A/V assembly body. The camera lens is protected from impacts by a protruding tube that surrounds it. Stereo microphones 603 flank the LCD display on the left and right sides, providing stereo sound position information to a remote user. A speaker 604 allows the remote user to speak to the local users. A transparent shatter resistant sheet 607 (polycarbonate in the preferred embodiment) connected to the assembly body with spacers 606 (shock absorbent foam in the preferred embodiment) protects the display screen in the event of a collision with an object such as a table. In an alternative embodiment, the display screen is mounted between two foam frames within the A/V assembly, and the transparent shatter resistant sheet is mounted flush with the front of the A/V assembly body. The camera may optionally also be mounted within the foam frames. This gives the A/V assembly a more conventional appearance as compared with a standard flat panel monitor bezel, but retains the benefit of impact protection with respect to the display screen and camera. In yet another alternative embodiment, an LCD formed on a plastic substrate, as opposed to a glass substrate, may be used. This would render the LCD flexible, and less likely to break from a fall or collision. Using a plastic LCD would thus eliminate the requirement for the shock absorption mechanisms that a glass LCD necessitates.

FIG. 7 is a cross-sectional view of the collapsible vertical support mechanism, here a telescoping tube. The upper tube is raised or lowered via use of a locking collar 702. By manually loosening the set screw 704 on the locking collar the upper tube is raised or lowered thereby adjusting the height of the A/V assembly (not shown) as needed. By tightening the set screw on the locking collar the height of the A/V assembly is fixed. Wires 705 for electrical connectivity between the A/V assembly and the base are routed through the upper and lower tubes. If the tubes are constructed of a material that is transparent to radio frequencies, such as plastic, an antenna 706 may optionally be placed within the tubes. The base's stalk receptacle 701 connects the base to the stalk. As shown the stalk attaches to the stalk receptacle through a force fitting held in place with an epoxy resin. Alternatively, the stalk may be securely fastened to the base's stalk receptacle using techniques known to people skilled in the mechanical arts.

Figure 8:
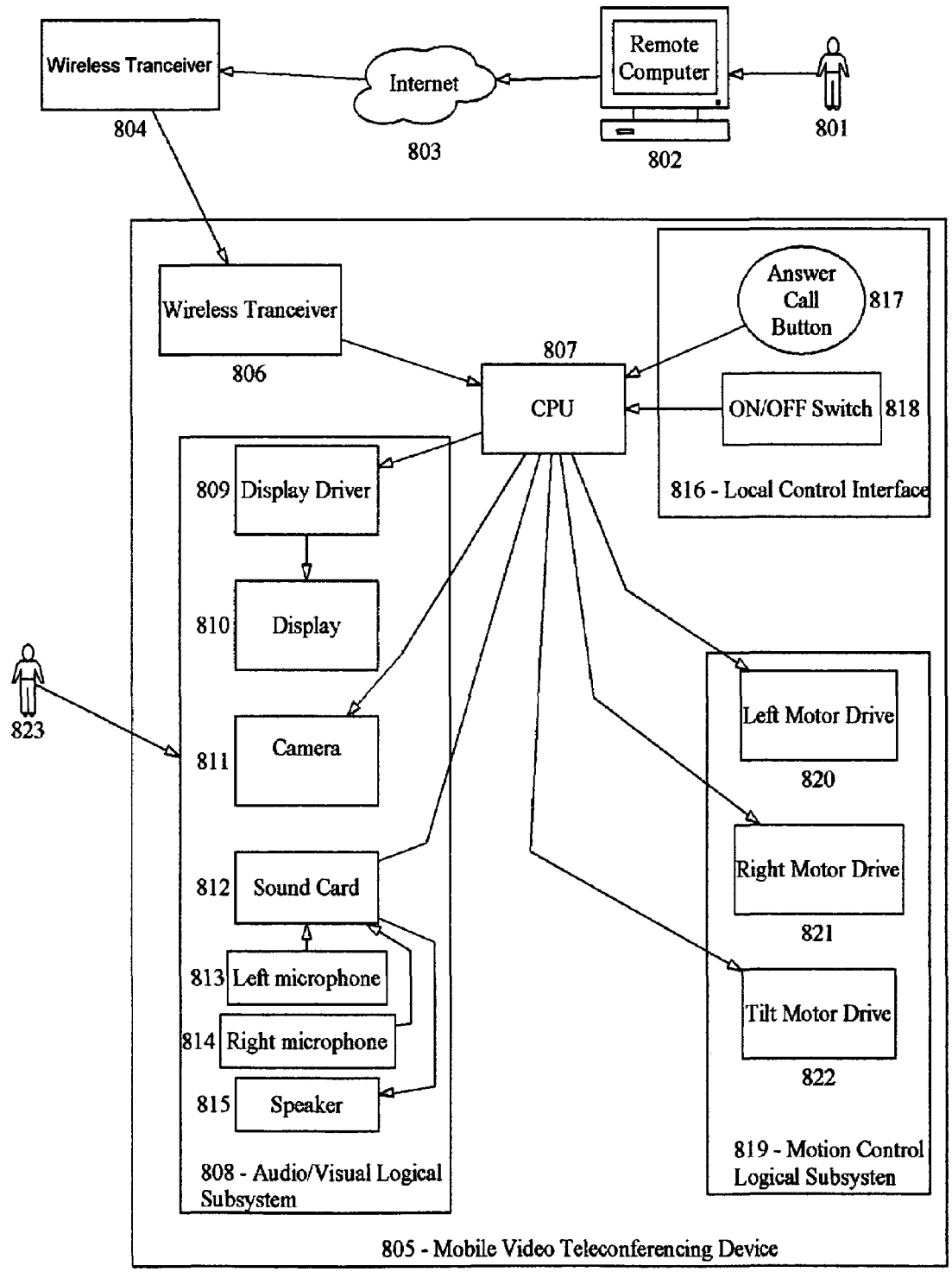
FIG. 8 is a system diagram showing how the mobile video teleconferencing device interfaces with its environment, and detailing its internal logical subsystems.

FIG. 8 is a system diagram showing how the MVTD 805 interfaces with its environment and detailing its internal logical subsystems. A remote user 801 is shown interacting with a remote computational device 802, here a personal computer. This computational device may also be a desktop computer, laptop computer, tablet computer, personal digital assistant, cell phone, video game system, or any other computational device capable of sending and receiving audio and video. In the preferred embodiment the remote computational device sends and receives data over the Internet 803. In alternative embodiments, the data link may be via a direct wireless or wired connection, private circuit-switched or packet-switched network, or public circuit-switched or packet-switched network. A first wireless transceiver 804 wirelessly transmits and receives the data to and from the MVTD. A second wireless transceiver 806 located on the MVTD receives and transmits data to and from the first wireless transceiver. In the preferred embodiment, 802.11-based transceivers are used, but alternative embodiments may use any wireless data transmission technology. A central processing unit ("CPU") 807 processes data sent to and from the second wireless transceiver. In the preferred embodiment, the CPU is contained in a low-cost commercially available x86 based motherboard, but other computational devices, such as commercially available single board computers, laptop computers, tablet computers, personal digital assistants, or cellular phones may also be used.

The CPU communicates with some components of the A/V logical subsystem 808. This communication can be through a parallel bus or a serial bus. Some or all of the A/V assembly may also be integrated with the CPU functionality. A display driver 809 converts image data sent from the CPU into a format suitable to be sent to a display 810. In the preferred embodiment the display driver is a personal computer video card, and the display is a touch screen LCD, although any display driver and display known in the art may also be used. A camera 811 sends video data to the CPU. The camera may communicate over a serial interface, such as the Universal Serial Bus, or over a parallel data interface when sending data to the CPU. The CPU also communicates with a sound card 812. In the preferred embodiment, this is a sound card suitable for use with a personal computer, although any other means of capturing two audio channel inputs and transmitting one audio channel output may be used. In one embodiment, the CPU electronically modifies the speech data before it is sent to the sound card in order to improve the realism of the remote user's voice. This may be achieved by boosting the amplitude of certain frequency ranges or attenuating the amplitude of certain frequency ranges in the digital domain. Techniques known in the art, such as the Fast Fourier Transformation, may be used to accomplish this. The sound card converts audio data from a format used within the CPU to a format capable of being heard over a speaker 815. The sound card also receives signals from a left channel microphone 813 and a right channel microphone 814 and converts the electrical signals into data capable of being processed by the CPU. This sound data is then transferred to the CPU via a parallel or serial interface. In an alternative embodiment, only one microphone is used, instead of two microphones.

The CPU also communicates with the motion control subsystem 819. The motion control subsystem controls actuation of the left motor drive 820, the right motor drive 821, and the tilt motor drive 822. The CPU communicates with the motion control subsystem via a parallel bus, a serial interface, through a printer port interface, through a general purpose digital output, or via an analog output. The data sent is either a high level motion command detailing a desired speed or velocity profile, a digital output proportional to a desired speed, an analog output proportional to a desired speed, or a pulse-width-modulated signal. The left motor drive, right motor drive, and tilt motor drive generate a powered signal suitable for driving an electric motor. The left motor drive drives a left-side motor used for translation and rotation of the device. The right motor drive drives a right-side motor also used for translation and rotation of the device. The tilt motor drive drives a tilt motor used for controlling the angle of the A/V assembly relative to the horizon. An optional position sensor, for example, an encoder or a hall effect sensor, may also be used by the tilt motor drive, left motor drive, or right motor drive to send position or velocity information back to the CPU.

The local control interface 816 enables the local user to control hardware level functionality of the system. The On/Off switch 818, allows the local user to turn the entire system on or off. When on, the system is capable of interacting with remote users, and utilizes battery power. When off, battery power is conserved, although the system may not be utilized by remote users. The answer call button 817 is used by a local user to accept an incoming request to control the device. In the preferred embodiment the answer call button is also used to terminate the current remote user's access to the device. Alternatively, a separate termination button may be used to terminate the current remote user's access to the device. In the preferred embodiment the answer call button is located on the front of the A/V assembly. In the preferred embodiment the On/Off switch is located on the base.

Figure 9:
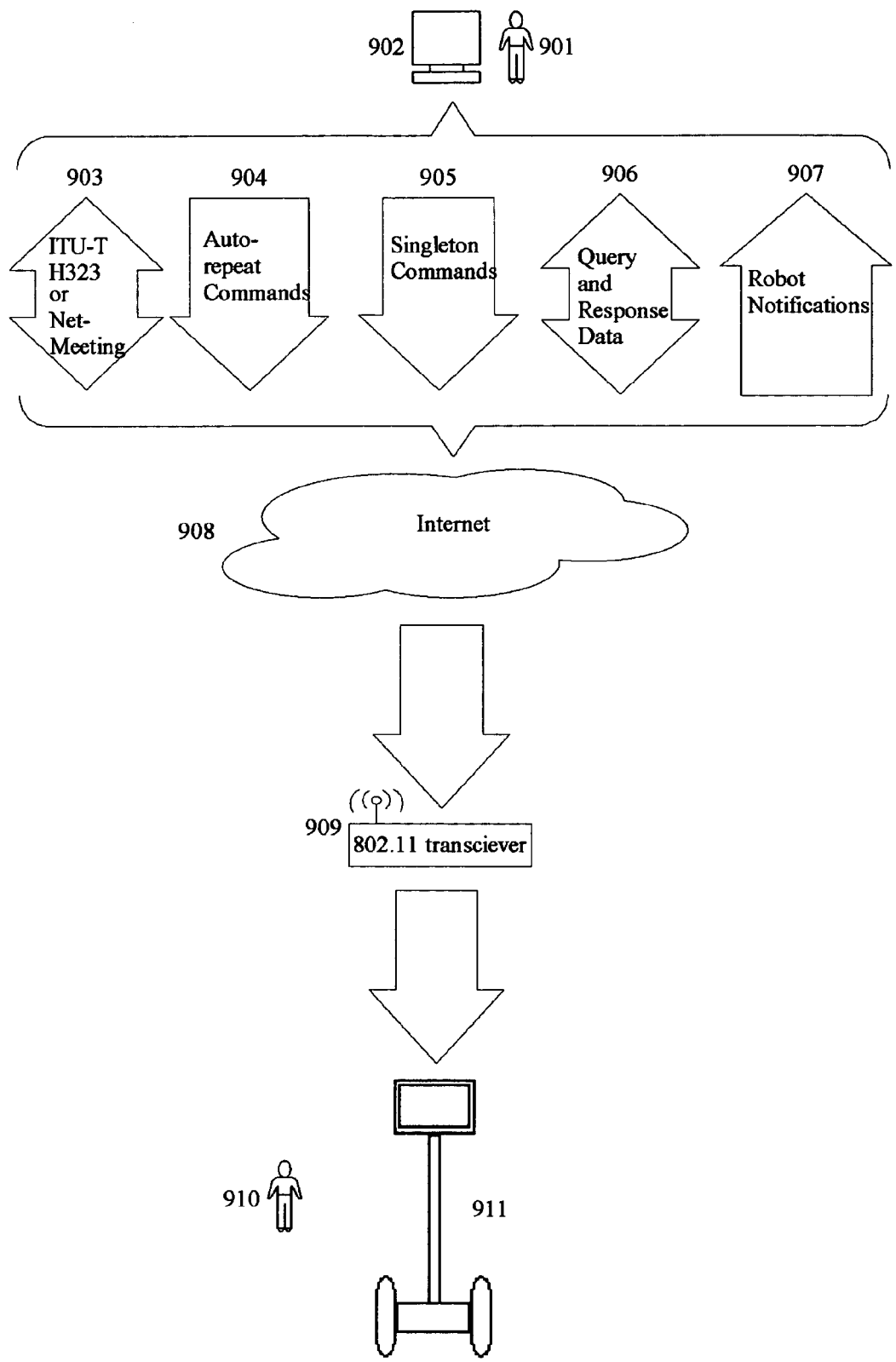
FIG. 9 is a data flow diagram detailing the command types and signal path for data exchanged between the remote computational device and the mobile video teleconferencing device.

FIG. 9 is a data flow diagram detailing the command types and signal path for data sent between the remote computational device and the MVTD. A remote user 901 is shown interacting with a remote computational device 902. The remote computational device sends and receives data through the Internet 908, to a local wireless transceiver 909, which is used to establish a wireless data link with the MVTD 911. A local user 910, is shown interacting with the MVTD.

Five categories of data interchange are supported over the data link between the remote computational device and the MVTD. A standardized video teleconferencing protocol 903, for example ITU-T H.323, is used to establish bi-directional video and audio link between the remote computational device and the MVTD. The other data interchange types are auto-repeat commands, singleton commands, robot notifications, and query and response sequences.

Auto-repeat commands 904 are used for repeating, short duration commands. For example, a command to move the MVTD to a new location could be composed of repeated requests to move at a specific velocity. By using multiple short-duration commands, the robot is less susceptible to uncontrolled movement in the event of a radio link or Internet link failure. As an example, assume the auto-repeat command consists of a request to move two meters per second for half of a second, and this command is sent ten times per second. If the wireless data link should suddenly fail, the last command processed will take no more than half a second to execute. At that time, the device would decelerate to a velocity of zero and await reestablishment of the link. By using repeated short duration commands the MVTD can be designed to slow down quickly in the event of link failure. This reduces the risks associated with unintended MVTD movements.

Singleton commands 905 are used when there is no safety concern associated with a link failure during the time in which a command is being processed. For example, a command to move the tilt mechanism to 30 degrees above the horizon would not result in any significant safety concerns even if the link failed before the commanded motion was completed. This is because the tilt mechanism can move the A/V assembly to the 30 degree mark without any undue danger.

Query and response data 906 consist of queries sent from the remote computational device to the MVTD that result in status information being sent back to the remote computational device from the MVTD. For example, a query from the remote computational device consisting of a request for the current MVTD tilt mechanism angle would return the MVTD's tilt mechanism angle.

Robot notifications 907 consist of status information that is sent from the robot to the remote computational device without being requested by the remote computational device. For example, if the device detects that the battery charge level is low, it may send a message alerting the remote computational device of this, thereby alerting the remote user of the need to drive the device to a docking station.

Figure 10:
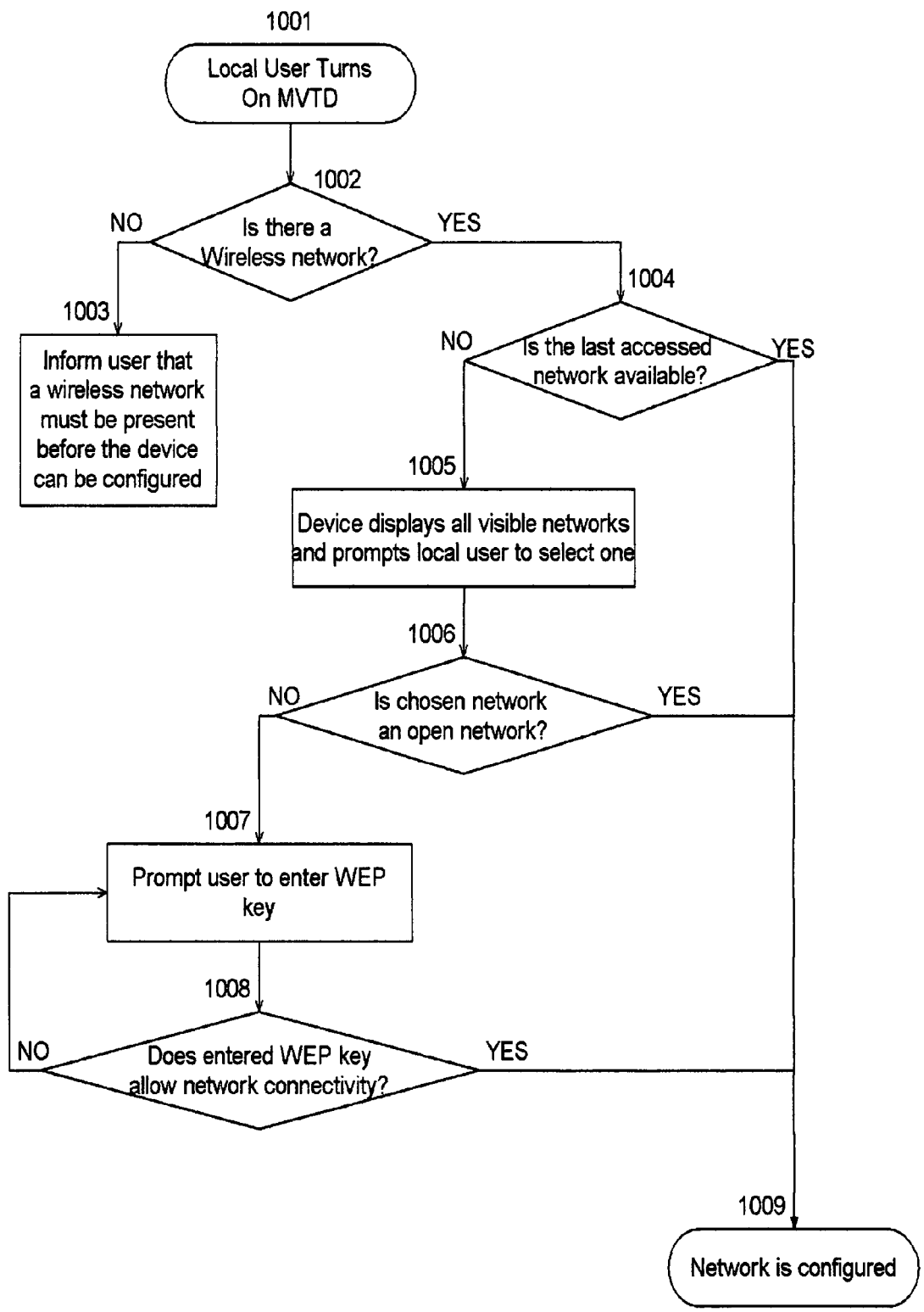
FIG. 10 is a flowchart detailing the straightforward process for connecting the MVTS to the Internet.

FIG. 10 is a flowchart detailing the straightforward process for connecting the MVTS to the Internet. In step 1001 the user turns on the MVTD. The device searches for and creates a list of usable local wireless networks. If no wireless networks are found the user is informed that a wireless network is required to use the MVTD 1003. Further troubleshooting information is also presented to the user at this time. If at least one network is found each found network is compared to the last accessed network 1004. If the last accessed network is available the network configuration is complete 1009. Turning on the device is thus all that is required to enable MVTS connectivity in most cases. If the last accessed network is not found, the local user must select a network 1005 from the list of usable networks found previously. This can occur if the MVTD is being used for the first, has been moved, or when the network has been changed or removed. The MVTD determines whether or not the chosen network is an open network 1006. If the network is open then the network configuration is complete 1009. Otherwise the user is prompted to enter the Wireless Encryption Protocol ("WEP") key, WiFi Protected Access ("WPA") key, or any other required encryption key 1007. Access to the network is tested using the entered key 1008. If the network is inaccessible the user is prompted to reenter the key 1007. If the network is accessible network configuration is complete 1009.

Figure 11:
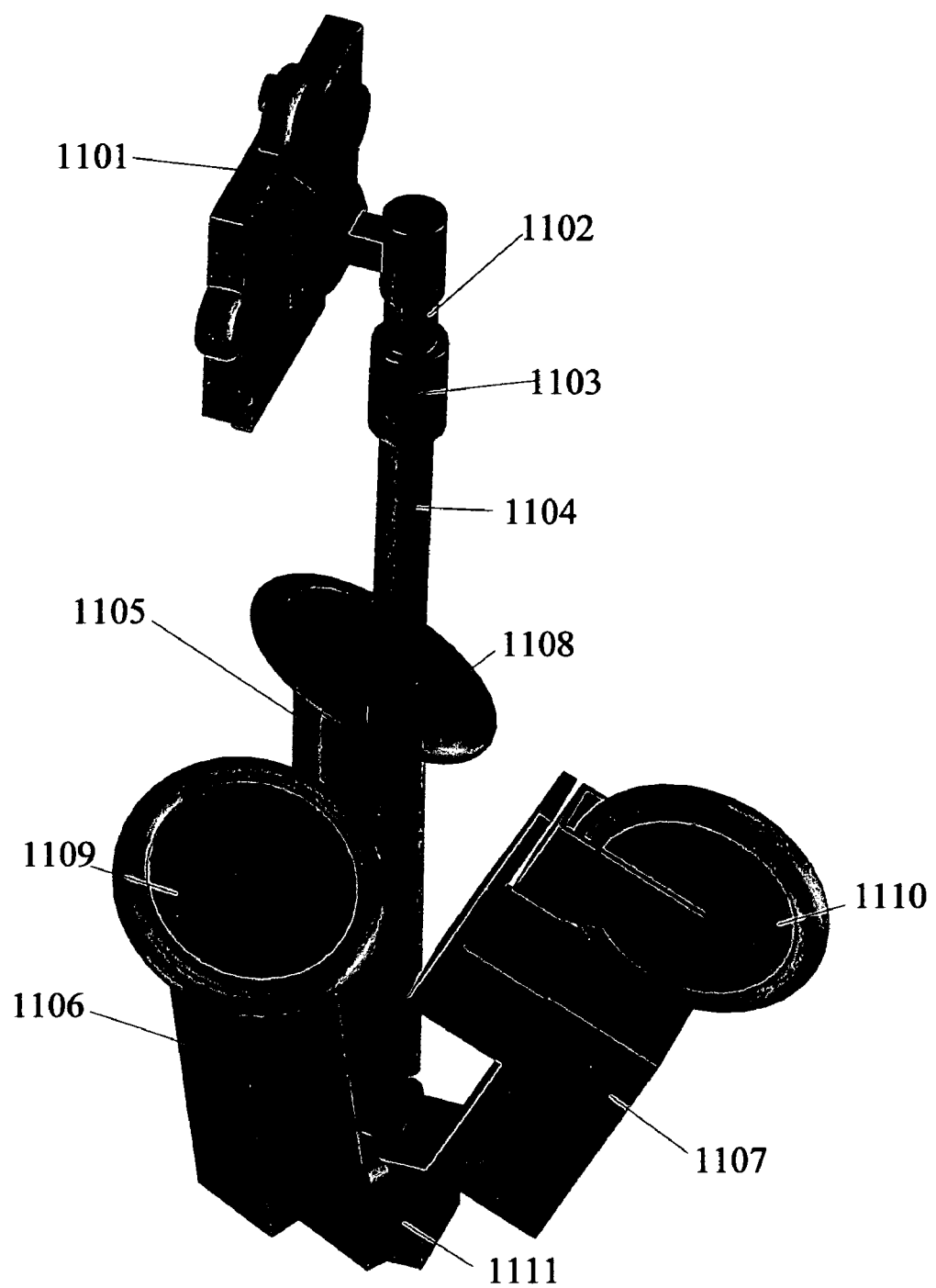
FIG. 11 is a view of the MVTD detailing how it may be folded for easy transportation and storage.

FIG. 11 is a view of the MVTD detailing how it may be folded for easy transportation and storage. The diagram illustrates the three wheeled tripod version of the MVTD. The A/V assembly 1101 is shown in its fully lowered configuration, where the upper vertical support member 1102 is fully retracted into the lower vertical support member 1104. The locking collar 1103 may be tightened to prevent the A/V assembly from shifting during transportation. The Y-shaped body 1111, is hinged in three locations for compact transportation and storage. The left powered outrigger assembly 1106 is shown hinged upwards, with the left wheel 1109 touching the vertical support member. Similarly the right powered outrigger assembly 1105 is hinged upwards with the right wheel 1108 touching the vertical support member. The rear outrigger assembly 1107 is also folded up towards the vertical support member. The left wheel 1109, right wheel 1108, and rear wheel 1110 may all be removed to further reduce the volume of the MVTD when being transported or stored. In alternative embodiments, the left powered outrigger, right powered outrigger, or rear outrigger may be completely removable from the rest of the body. Alternatively a mixture of hinges and removable sections may be used, and in other embodiments, some but not all of the outriggers may be folded or removed to reduce storage space. In alternate embodiments, a T-shaped base may also be composed of folding or removable sections. Similarly, a two wheeled dynamically stabilized embodiment may be designed such that the base folds up to rest along the vertical support member. Alternatively, two wheeled dynamically stabilized embodiment may consist of removable base sections, or base sections that fold away from the vertical support member.

If the upper vertical support member is fully collapsed within the lower vertical support member, a height reduction of almost 50% over the tallest setting may be achieved. Folding or removing the base, and removing the wheels can further reduce the rectangular volume of the MVTD. Overall volume reductions of 75% are possible with a combination of these techniques.

ADVANTAGES

What has been described is a new and improved mobile video teleconferencing system overcoming the many disadvantages of related video teleconferencing systems. Specifically, using a mobility control unit enables the device to be remotely moved through its environment. Placing a lightweight A/V assembly atop a lightweight stalk allows the overall device weight to be kept low. The reduction of drive components through the use of a two-wheeled base further reduces overall weight. The device's light weight results in a number of advantages. The device may be carried up stairs by a person in its local environment, thereby simplifying the problem of ascending stairs. More generally, the device may be hand-carried to new locations that its drive system is unable to reach. The device may be shipped by low-cost shipping means (due to its low weight and collapsibility), both from the point of purchase, and when being shipped to a new remote location. Using an impact protection element protects the device from damage in the event it falls over. The adjustable stalk height better approximates face-to-face interaction. In the embodiments that support stair climbing the remote user's ability to navigate obstructions in the local environment is greatly enhanced as compared to traditional video teleconferencing system. The docking station allows continuous use of the MVTS by the remote user without requiring maintenance actions by local users. The MVTS is the first Internet appliance designed for mobile video teleconferencing due to the streamlined network configuration process, the MVTS's low cost, light weight, straightforward usability, and its minimal additional hardware requirements.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A mobile video teleconferencing apparatus comprising:
   (a) a base;
   (b) two wheels rotatably connected to the base in a statically unstable configuration;
   (c) a movement control subsystem mechanically rotating at least one of the plurality of wheels;
   (d) a video subsystem comprising a video camera;
   (e) a central processing unit, the central processing unit controlling the movement control subsystem, and accepting video data from the video camera;
   (f) a data link for communicating between the central processing unit and a remotely located computational device, the data link sending video data to the remotely located computational device, and receiving movement control data from the remotely located computational device;
   (g) a vertical support member, the top of the vertical support member supporting the video subsystem and the bottom of the vertical support member connected to the base; and
   (h) a dynamic stabilization subsystem, whereby the statically unstable apparatus is kept substantially upright in the fore-aft plain through a control loop which senses the forces acting on the apparatus and drives the movement control subsystem.

2. The apparatus of claim 1, further comprising:
   a charging station with a stabilizing mating connector, whereby when the statically unstable mobile video teleconferencing apparatus docks with the stabilizing mating connector, the stabilizing mating connector statically stabilizes the mobile video teleconferencing apparatus.

3. A mobile video teleconferencing apparatus comprising:
   (a) a base;
   (b) a plurality of wheels rotatably connected to the base;
   (c) a movement control subsystem mechanically rotating at least one of the plurality of wheels;
   (d) a video subsystem comprising a video camera and a video display;
   (e) a central processing unit, the central processing unit controlling the movement control subsystem, accepting video data from the video camera, and sending video data to the video display;
   (f) a data link for communicating between the central processing unit and a remotely located computational device, the data link sending video data to the remotely located computational device, and receiving movement control data and video data from the remotely located computational device;
   (g) a vertical support member, the top of the vertical support member supporting the video subsystem and the bottom of the vertical support member connected to the base,
   (h) whereby the apparatus may be carried with one hand by a human of average strength without mechanical assistance; and
   (i) a dynamic stabilization system, whereby the apparatus is kept substantially upright through the electromechanical movement of a weighted element positioned by a control loop which maintains the center of gravity, averaged over time, when projected onto a horizontal plane, inside the convex hull formed by the ground contact patches of the wheels, the convex hull also projected onto the horizontal plane.

4. The apparatus of claim 3, wherein: at least part of the vertical support structure is used as the weighted element, and a force sensor is used as the input to the control loop.

5. The apparatus of claim 3, wherein: Four wheels are arranged in a trapezoidal configuration, the first and second wheels rotating around a first axis and the third and fourth wheels rotating around a second axis, the first wheel and third wheel being on the same side of the axis of symmetry of the trapezoid, the first and third wheels being driven by a first motor and gear train, and the second and fourth wheels being driven by a second motor and gear train, whereby the apparatus may be used to climb stairs, the distance between the first and second axis being at least equal to the height of the tallest stair to be climbed and the weighted element is electromechanically positioned so as to substantially equalize the weight on the wheels.

6. A mobile video teleconferencing apparatus comprising:
   (a) a base;
   (b) a plurality of wheels rotatably connected to the base;

(c) a movement control subsystem mechanically rotating at least one of the plurality of wheels;
(d) a video subsystem comprising a video camera and a video display;
(e) a central processing unit, the central processing unit controlling the movement control subsystem, accepting video data from the video camera, and sending video data to the video display;
(f) a data link for communicating between the central processing unit and a remotely located computational device, the data link sending video data to the remotely located computational device, and receiving movement control data and video data from the remotely located computational device;
(g) a hinge;
(h) a vertical support member, the top of the vertical support member connected to the hinge and the bottom of the vertical support member connected to the base; and
(i) a video subsystem to hinge bridging member supporting the video subsystem and connected to the hinge,
(j) wherein the apparatus may be collapsed into a rectangular volume that is less than half of the rectangular volume when uncollapsed by folding the apparatus at the hinge.

7. The apparatus of claim 6, further comprising:
an oscillation damper connected to the base and vertical support member, whereby the amplitude and duration of oscillation of the video camera is reduced, and the video camera image quality is improved.

8. A mobile video teleconferencing apparatus, comprising:
(a) a base;
(b) a plurality of wheels rotatably connected to the base;
(c) a movement control subsystem mechanically rotating at least one of the plurality of wheels;
(d) a video subsystem comprising a video camera and a video display;
(e) a central processing unit, the central processing unit controlling the movement control subsystem, accepting video data from the video camera, and sending video data to the video display;
(f) a data link for communicating between the central processing unit and a remotely located computational device, the data link sending video data to the remotely located computational device, and receiving movement control data and video data from the remotely located computational device;
(g) a vertical stalk connected to the base;
(h) the video subsystem connected to the vertical stalk; and
(i) a passive impact absorber, connected to the video subsystem, whereby impact from a collision with the video subsystem video display is substantially absorbed by the impact absorber.

9. A method of controlling a mobile video teleconferencing apparatus, comprising:
(a) transmitting a first command to move a mobile video teleconferencing apparatus a first short distance from a remotely located controller, the mobile video teleconferencing apparatus comprising: a base, a plurality of wheels rotatably connected to the base, a movement control subsystem mechanically rotating at least one of the plurality of wheels, a video subsystem comprising a video camera, a central processing unit, the central processing unit controlling the movement control subsystem and accepting video data from the video camera, and a data link for communicating between the central processing unit and a remotely located computational device, the data link sending video data to the remotely located computational device, and receiving movement control data from the remotely located computational device;
(b) accelerating the mobile video teleconferencing apparatus to a target velocity in response to the first command;
(c) transmitting from the remotely located controller a repeating series of subsequent commands to move the mobile video teleconferencing apparatus a series of additional short distances;
(d) continuing to move the mobile video teleconferencing apparatus at the target velocity in response to the repeating series of subsequent commands; and
(e) stopping the mobile video teleconferencing apparatus when it moves the sum total of the series of additional short distances without receiving an additional movement command.

* * * * *